(12) United States Patent
Asada et al.

(10) Patent No.: US 8,807,265 B2
(45) Date of Patent: Aug. 19, 2014

(54) TRACTOR

(75) Inventors: Akihiro Asada, Kawachinagano (JP);
Yoshihisa Tahara, Sakai (JP); Kiyokazu Fujibayashi, Izumi (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/606,253

(22) Filed: Sep. 7, 2012

(65) Prior Publication Data

US 2013/0240286 A1      Sep. 19, 2013

(30) Foreign Application Priority Data

Sep. 14, 2011   (JP) .................................. 2011-201010
Sep. 14, 2011   (JP) .................................. 2011-201011

(51) Int. Cl.
*B62D 1/19* (2006.01)
(52) U.S. Cl.
CPC ...................................... *B62D 1/195* (2013.01)
USPC ............................ 180/400; 280/777; 280/779
(58) Field of Classification Search
CPC ............ B62D 1/195; B62D 5/00; B62D 7/22; B62D 7/224
USPC ........... 280/775, 777, 779; 464/162; 180/400, 180/443, 444
See application file for complete search history.

(56) References Cited

U.S. PATENT DOCUMENTS

| | | | |
|---|---|---|---|
| 5,758,545 A * | 6/1998 | Fevre et al. | 74/493 |
| 6,123,481 A * | 9/2000 | Oka et al. | 403/228 |
| 8,091,449 B2 * | 1/2012 | Fuchigami et al. | 74/493 |
| 2006/0028010 A1 | 2/2006 | Yamada | |

FOREIGN PATENT DOCUMENTS

| | | | |
|---|---|---|---|
| JP | 6167277 U | | 5/1986 |
| JP | 333293 U | | 4/1991 |
| JP | 1095352 A | | 4/1998 |
| JP | 200268026 A | | 3/2002 |
| JP | 2002068026 A | * | 3/2002 |
| JP | 2002347631 A | | 12/2002 |
| JP | 2003137116 A | | 5/2003 |
| JP | 200419775 A | | 1/2004 |
| JP | 200482868 A | | 3/2004 |
| JP | 2010105662 A | | 5/2010 |

* cited by examiner

*Primary Examiner* — Joseph M Rocca
*Assistant Examiner* — Felicia L Brittman
(74) *Attorney, Agent, or Firm* — The Webb Law Firm (57) ABSTRACT

A tractor includes: a driver's compartment; an engine compartment; a partitioning member that partitions the driver's compartment and engine compartment and has a through-hole; a steering wheel provided in the driver's compartment; a power steering unit disposed on the engine compartment side; a steering shaft that extends from the steering wheel and is connected to the power steering unit; an elastic sealing member provided in an inner circumferential portion of the through-hole; and an anti-vibration member. The elastic sealing member includes a supported portion supported to the inner circumferential portion and a ring-shaped lip portion protruding downward from one end of the supported portion. The power steering unit is mounted to the partitioning member via the anti-vibration member, the ring-shaped lip portion is elastically clamped to the upper face of the power steering unit, and the steering shaft is connected to the power steering unit while inserted in the through-hole.

5 Claims, 10 Drawing Sheets

TRACTOR

BACKGROUND OF THE INVENTION

1. Field of the Invention

The present invention relates to a tractor that includes a power steering unit.

2. Description of the Related Art

The tractor disclosed in JP 2002-68026A is one tractor of this type. With this tractor, the power steering unit is mounted to a support member, which constitutes part of a partitioning member, via an anti-vibration member (e.g., see paragraphs 0014 to 0015 and FIG. 2).

More specifically, a base plate for mounting is anchored to the upper face of the power steering unit, and connection pipes filled with anti-vibration rubber are mounted at multiple locations on the outer periphery of the base plate. A through-hole is formed in a cabin floor that constitutes part of the partitioning member, the power steering unit is inserted through this through-hole to the engine compartment side, and bolts fitted in anti-vibration rubber are fastened to the cabin floor with the outer peripheral region of the base plate opposing the edge portion of the through-hole from above.

SUMMARY OF THE INVENTION

With the above-described tractor, a relatively thin plate-shaped sealing member is provided between the outer periphery region of the base plate and the edge portion of the through-hole in the cabin floor, as a means for preventing outside dust and the like from entering the driver's compartment via a gap between the base plate and the cabin floor. For this reason, noise and vibration generated by the power steering unit are readily transmitted to the driver's compartment via this plate-shaped sealing member, and there is the risk of difficulty in obtaining sufficient quietness in the driver's compartment.

In view of this, there is desire for a tractor configured such that quietness is readily obtained in the driver's compartment while suppressing the entrance of outside dust and the like to the cabin.

A tractor according to an aspect of the present invention includes: a driver's compartment; an engine compartment; a partitioning member that partitions the driver's compartment and the engine compartment and has a through-hole formed therein; a steering wheel provided in the driver's compartment; a power steering unit disposed on the engine compartment side; a steering shaft that extends from the steering wheel and is connected to the power steering unit; an elastic sealing member that is provided in an inner circumferential portion of the through-hole, and includes a supported portion that is supported to the inner circumferential portion and a ring-shaped lip portion that protrudes downward from one end of the supported portion; and an anti-vibration member, wherein the power steering unit is mounted to the partitioning member via the anti-vibration member, the ring-shaped lip portion is elastically clamped to an upper face of the power steering unit, and the steering shaft is connected to the power steering unit in a state of being inserted in the through-hole.

According to the tractor having the above feature configuration, the ring-shaped gap that appears between the upper face of the power steering unit and the through-hole is reliably sealed by the ring-shaped lip portion of the elastic sealing member, thus preventing dust from entering the driver's compartment from the engine compartment, and effectively suppressing the entrance of noise to the driver's compartment as well.

Note that since vibration generated by the power steering unit is attenuated by the anti-vibration member used in the mounting of the power steering unit, such vibration is not readily transmitted to the driver's compartment via the support member. Also, the elastic sealing member is in contact with the upper face of the power steering unit via only the ring-shaped lip portion, thus suppressing the problem where the attenuating effect of the elastic sealing member is inhibited by the anti-vibration member such that vibration generated by the power steering unit is transmitted from the elastic sealing member to the driver's compartment via the support member, and also making it easier to obtain quietness in the driver's compartment.

In the above configuration, at least a tip portion of the ring-shaped lip portion may extend inclined one of radially inward and radially outward relative to a shaft center of the steering shaft.

According to the above configuration, due to the elastic sealing member being pressed against the upper face of the power steering unit, the entire circumference of the tip region of the lower end portion of the ring-shaped lip portion readily deforms in a certain direction, either inward or outward. Accordingly, compared to a configuration in which the ring-shaped lip portion, also including the tip portion thereof, extends perpendicular to the shaft center of the steering shaft, the rising up of part of the ring-shaped lip portion and the like do not readily occur, and a more reliable sealing effect is obtained. Also, the tip of the ring-shaped lip portion is not readily damaged due to being pressed against the upper face of the power steering unit, and a robust sealing effect is more readily maintained long-term.

In the above configuration, the steering shaft may have an upper steering shaft having the steering wheel at an upper portion, and a lower steering shaft whose lower portion is connected to the power steering unit, and the tractor may further include: an extension/retraction mechanism that enables integral rotation of the upper steering shaft and the lower steering shaft and relative movement thereof along a shaft center; and a restriction mechanism that restricts the relative movement of the upper steering shaft and the lower steering shaft along the shaft center, the restriction mechanism having an inner tube member that covers and supports the lower steering shaft, an outer tube member that covers and supports the upper steering shaft, and a wedge member that is operated so as to be pressed upward from a lower end side of the outer tube member in between the inner tube member and the outer tube member.

Also, in the above configuration, a tube-shaped bushing may be provided in a ring-shaped gap between the inner tube member and the outer tube member, and the wedge member may be a wedge-shaped tube body that has a cylinder-shaped inner circumferential face that interacts with an outer circumferential face of the inner tube member, and a tapered outer circumferential face that interacts with an inner circumferential face of the outer tube member, a shaft center of the cylinder-shaped inner circumferential face being eccentric to a shaft center of the tapered outer circumferential face.

Also, the tractor having the above configuration may further include a constricting member having a slit that extends upward from a lower end of the outer tube member and a constricting portion that operates such that outer circumferential positions of the outer tube member that are positioned sandwiching the slit are brought closer to each other.

BRIEF DESCRIPTION OF THE DRAWINGS

FIG. 2 is a side view showing a steering apparatus and the like.

DETAILED DESCRIPTION OF PREFERRED EMBODIMENTS

Hereinafter, an embodiment of the present invention will be described with reference to the drawings.

[Overall Configuration of Tractor]

Figure 1:
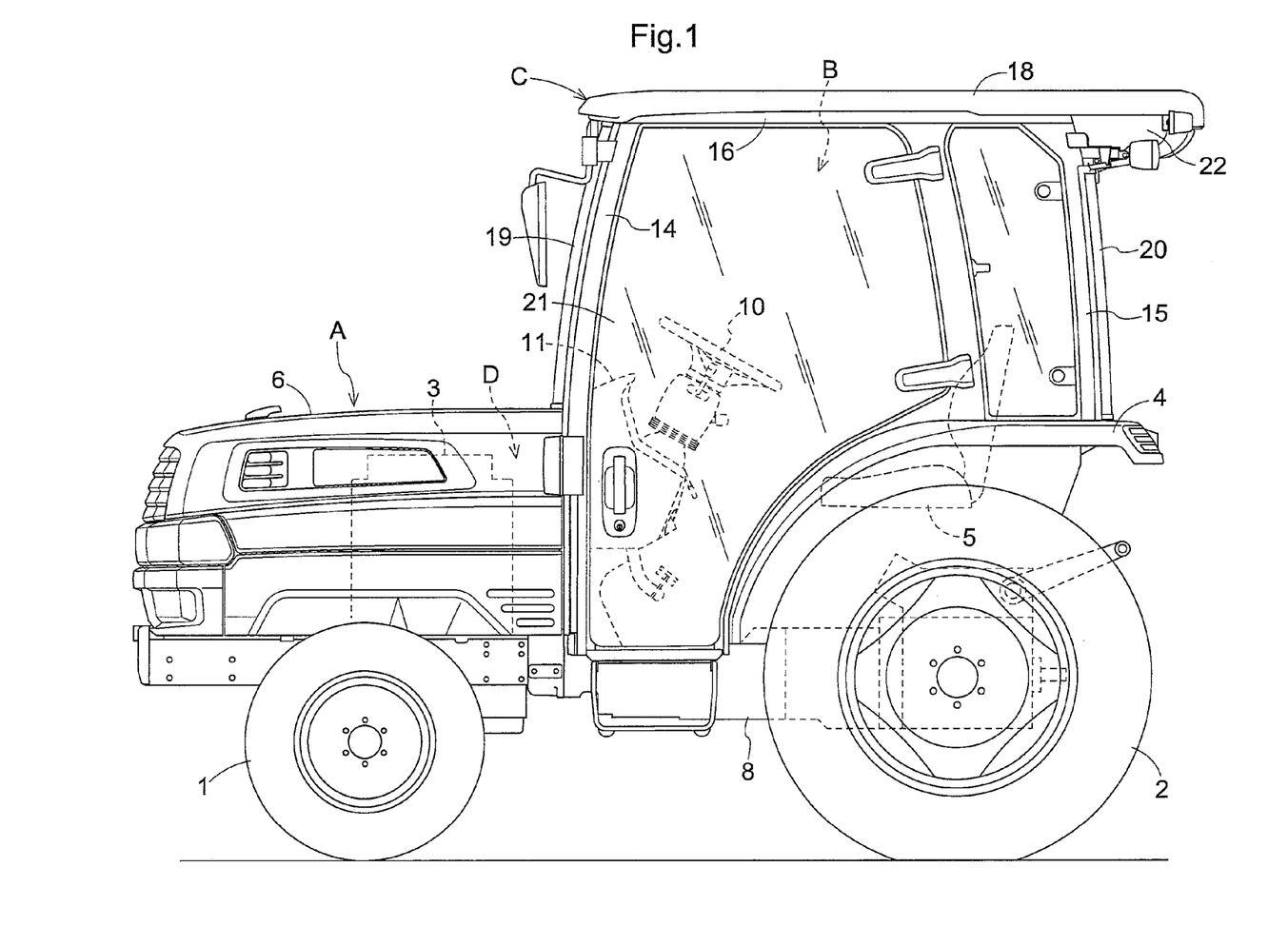
FIG. 1 is a side view showing the entirety of a tractor.

The tractor shown in FIG. 1 includes a pair of steerable left and right front wheels 1, a pair of left and right rear wheels 2, an engine portion A that has an engine 3 in the front portion of the vehicle body, a driver's compartment B that has a driver's seat 5 between left and right rear wheel fenders 4 in the rear portion of the vehicle body, and a cabin C that surrounds the driver's compartment B.

The engine 3 is housed in an engine compartment D formed by a hood 6 in the front portion of the vehicle body, and a transmission case 8 that transmits driving force from the engine 3 to the rear wheels 2 is provided so as to be oriented along the front-rear direction of the vehicle body.

This tractor is configured such that tilling work can be performed by connecting a rotary tilling apparatus to the rear end of the vehicle body, and plowing work can be performed by connecting a plow to the rear end of the vehicle body.

The cabin C includes a pair of left and right column-shaped front vertical frames 14, a pair of left and right column-shaped rear vertical frames 15, and upper connecting frames 16 that form a rectangle when viewed from above and connect together the upper ends of the front vertical frames 14 and the rear vertical frames 15.

The tractor also includes a plate-shaped roof 18 that is provided at a position where it covers the upper connecting frame 16, a windshield 19 that is provided at a position where it is surrounded by the pair of left and right front vertical frames 14 and the front-side upper connecting frame 16, a rear window 20 that is provided at a position where it is surrounded by the pair of left and right rear vertical frames 15 and the rear-side upper connecting frame 16, and an openable/closable door 21 that is made of glass and provided at a position on one side of the tractor.

In this way, the cabin C has a structure according to which the ceiling wall is configured by the roof 18, wall portions that surround the driver's seat 5 are configured by the windshield 19, the rear window 20, the door 21, and the like, and the driver's space is isolated from the outside by the ceiling wall and the wall portions. This tractor includes an air-conditioning system 22 that cools and heats the cabin C, and sound insulation panels 24A and 24B are disposed at positions behind the hood 6, thus creating a comfortable work environment in the driver's compartment B by preventing inconveniences where the driver's compartment B is infiltrated by noise such as engine noise generated by the engine 3 under the hood and dust and the like from under the hood.

[Configuration of Steering Apparatus]

Figure 2:
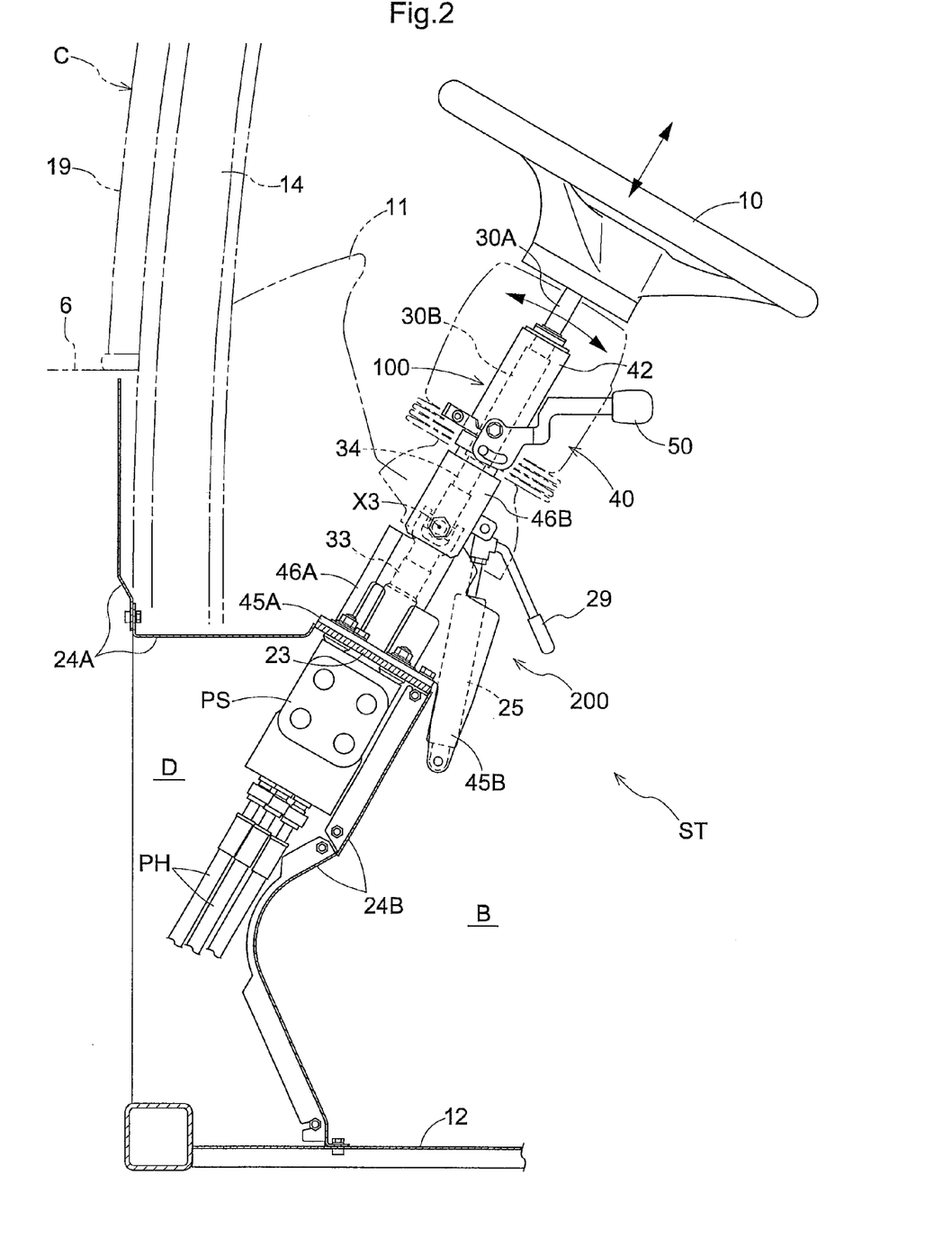

As shown in FIG. 2, a steering wheel 10 is disposed in the driver's compartment B, a meter panel plate 11 is disposed facing downward from a position in front of the steering wheel 10, and a floor 12 is formed on the lower side of the driver's compartment B.

With this tractor, a fully hydraulic power steering unit PS is applied in the steering driving system. The power steering unit PS supplies hydraulic oil via a hydraulic hose PH to an actuator (not shown) for steering the front wheels 1 in response to operations performed on the steering wheel 10.

As previously mentioned, the driver's compartment B is separated from the engine compartment D by the sound isolation panels 24A and 24B (examples of a partitioning member), and the power steering unit PS is disposed on the engine compartment D side in order to improve quietness in the cabin C.

Figure 3:
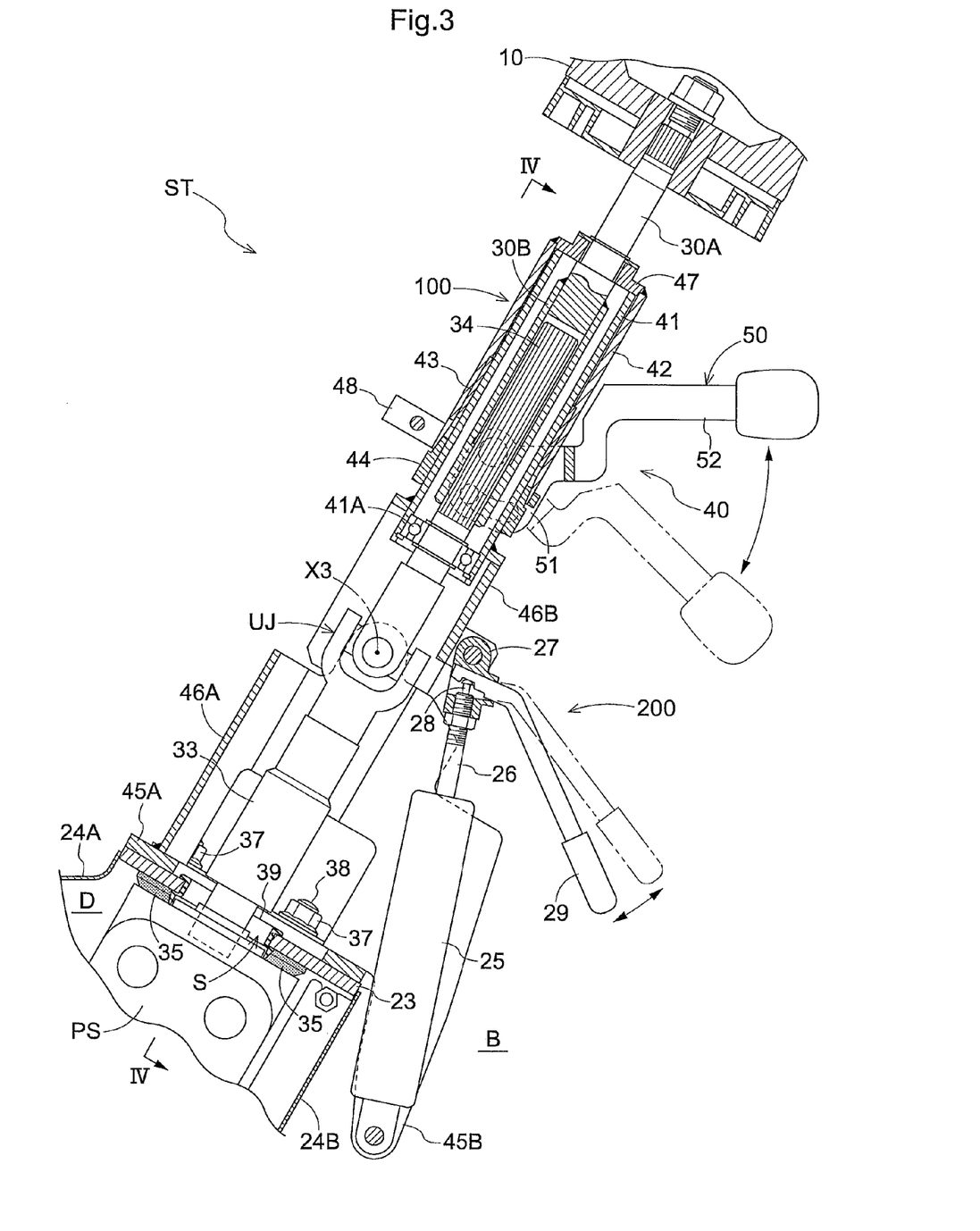
FIG. 3 is a partial cutaway side view showing an extension/retraction mechanism and a tilt mechanism of the steering apparatus.
Figure 4:
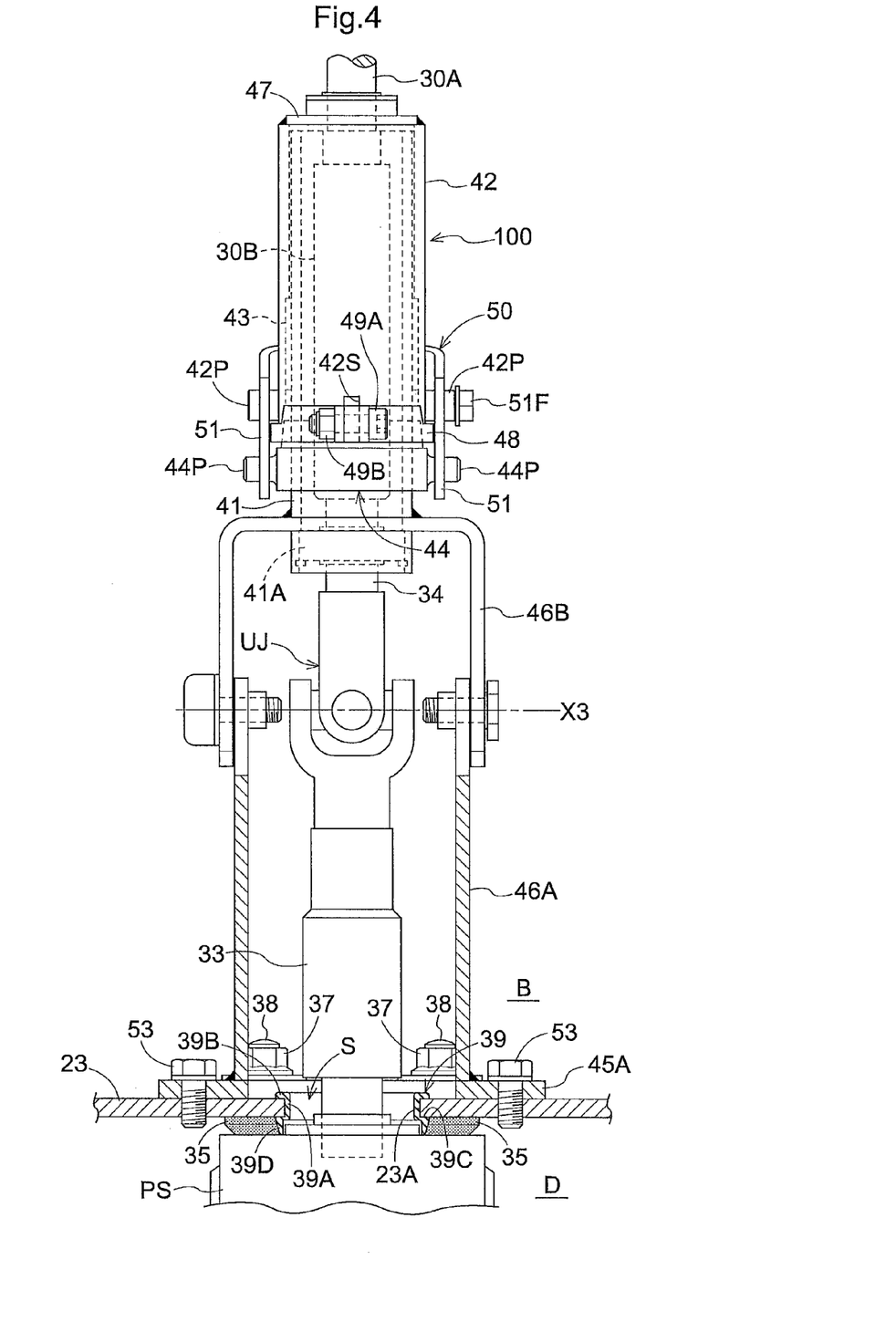
FIG. 4 is a partial cutaway front view along an arrow IV-IV in FIG. 3.

As shown in FIGS. 3 and 4, a steering apparatus ST for transmitting rotation operations performed on the steering wheel 10 to the power steering unit PS has upper steering shafts 30A and 30B (examples of a steering shaft) that extend downward from the steering wheel 10, a first lower steering shaft 33 (an example of a steering shaft) whose lower end portion is connected to the power steering unit PS and a second lower steering shaft 34 (an example of a steering shaft), and an extension/retraction mechanism 100 that enables integral rotation of the upper steering shafts 30A and 30B and the first lower steering shaft 33 and relative movement thereof along a shaft center.

[Configuration of Extension/Retraction Mechanism]

The extension/retraction mechanism 100 includes the tube-shaped upper steering shaft 30B that constitutes the lower half of the upper steering shafts 30A and 30B, and the second lower steering shaft 34 that is supported inside the upper steering shaft 30B. The inner circumferential face of the upper steering shaft 30B and the outer circumferential face of the second lower steering shaft 34 are provided with spline grooves for stopping relative rotation between them while allowing them to smoothly slide along the shaft center. The lower end of the second lower steering shaft 34 is connected to the upper end of the first lower steering shaft 33 via a universal joint UJ.

Movement of the upper steering shafts 30A and 30B relative to the first lower steering shaft 33 along the shaft center due to the extension/retraction mechanism 100 is restricted by a restriction mechanism 40 that includes an inner tube member 41 that covers and supports second lower steering shaft 34 (an example of a lower steering shaft), an outer tube member 42 that is fit around the inner tube member 41 and supports the upper steering shafts 30A and 30B, a tube-shaped bushing 43 that is provided in the ring-shaped gap between the inner tube member 41 and the outer tube member 42, and a wedge-shaped tube body 44 (an example of a wedge member) that is disposed so as to fit around the inner tube member 41 at a position in the vicinity of the lower end of the outer tube member 42.

The lower end region of the inner tube member 41 is fixed so as to be fit inside a later-described second steering wheel support frame 46B, and the outer tube member 42 is closed by a disc-shaped cover member 47 that rotatably supports part of the upper steering shaft 30A.

Also, the inner portion of the lower end region of the inner tube member 41 is provided with a bearing 41A that rotatably supports part of the second lower steering shaft 34, and a pair of cylinder members 42P extend radially outward from the lower end region of the outer tube member 42 so as to oppose each other across the shaft center.

Figure 7:
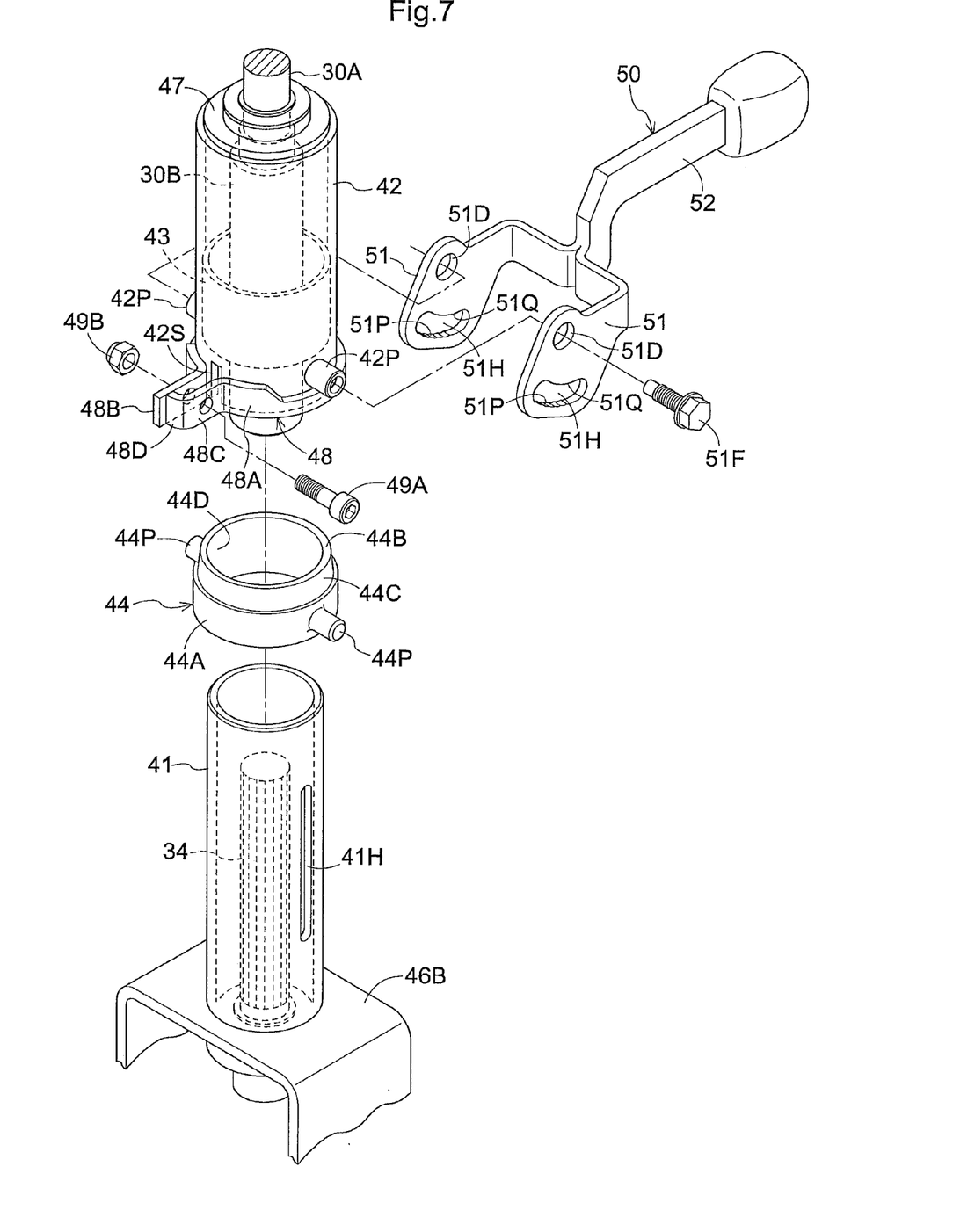
FIG. 7 is an exploded perspective view showing the extension/retraction mechanism.
Figure 8A:
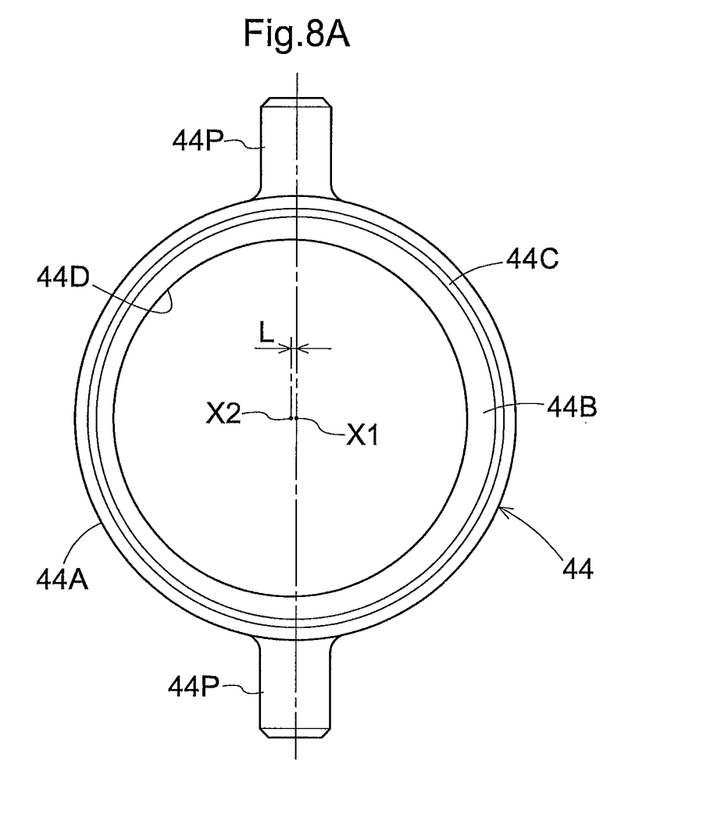
FIG. 8A is a plan view showing a wedge-shaped tube body of the extension/retraction mechanism.
Figure 8B:
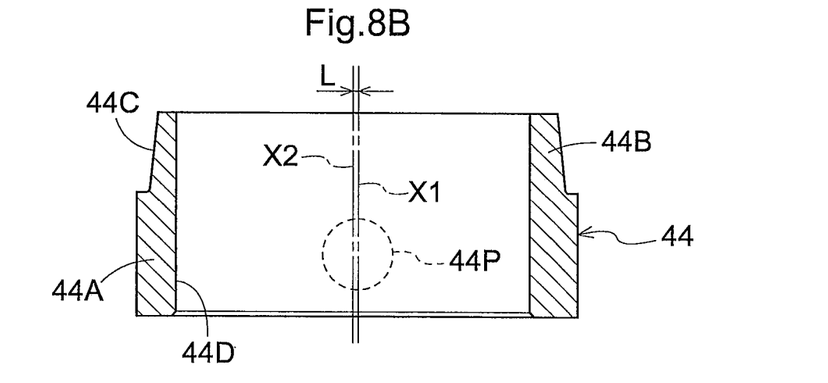
FIG. 8B is a cutaway side view showing the wedge-shaped tube body of the extension/retraction mechanism.

As shown in FIGS. 7, 8A, and 8B, the wedge-shaped tube body 44 has a base portion 44A whose thickness is constant along the shaft center and a tip portion 44B that extends upward from the upper end of the base portion 44A, and the outer circumferential face of the tip portion 44B is formed as a tapered outer circumferential face 44C whose thickness gradually increases downward.

Also, a pair of substantially circular column-shaped operated shaft portions 44P extend radially outward from the base portion 44A of the wedge-shaped tube body 44 so as to oppose each other across the shaft center.

Furthermore, as shown in FIG. 8A, a cylinder-shaped inner circumferential face 44D that interacts with the outer circumferential face of the inner tube member 41 is specially tube-shaped such that a shaft center X2 of the inner circumferential face 44D is slightly eccentric forward or rearward relative to a shaft center X1 of the tapered outer circumferential face 44C that interacts with the inner circumferential face of the outer tube member 42. An eccentricity amount L between the shaft center X1 and the shaft center X2 can be set to 0.5 mm, for example.

Figures 5A, 5B:
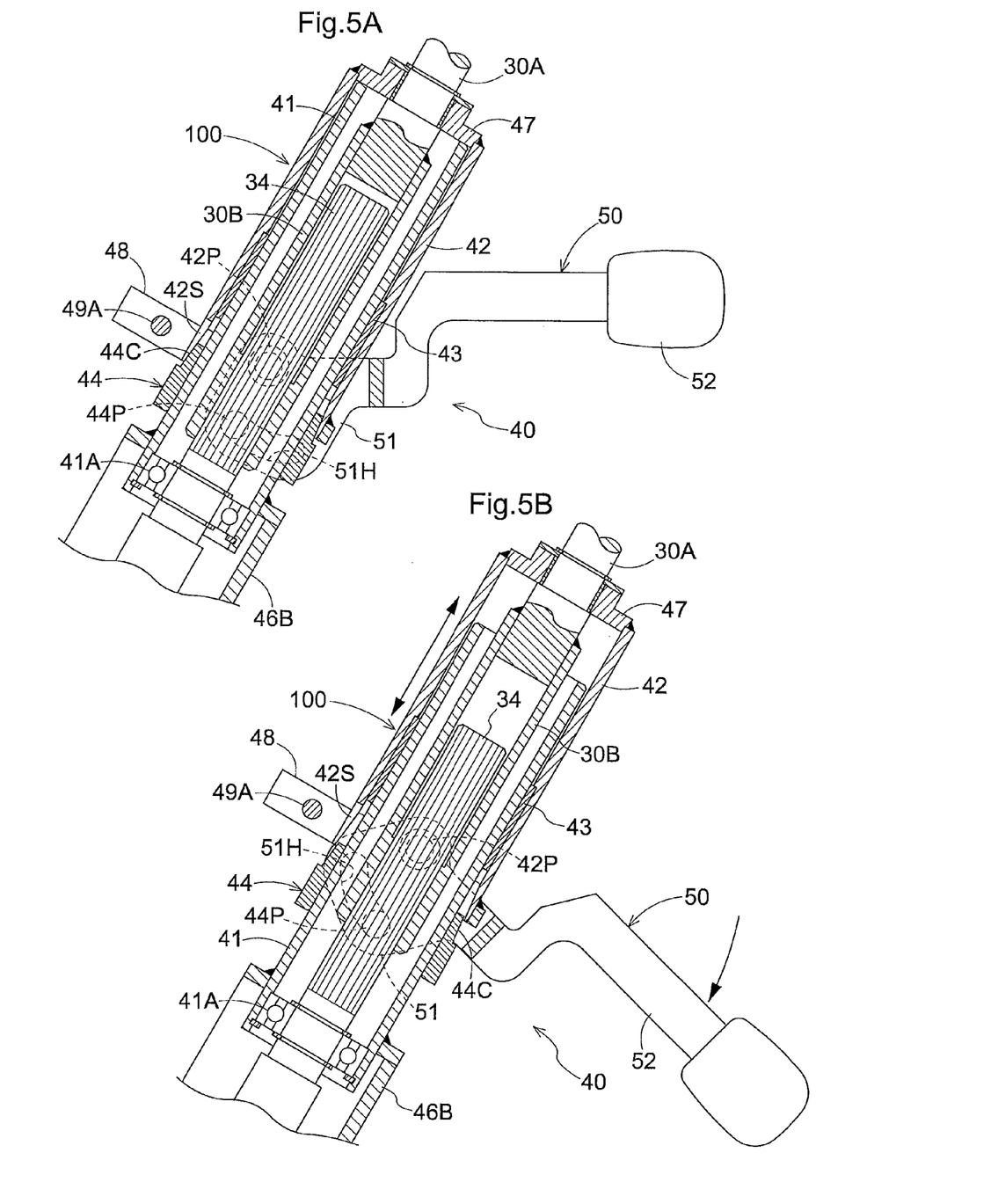
FIG. 5A is a side view showing the action of the extension/retraction mechanism.
FIG. 5B is another side view showing the action of the extension/retraction mechanism.
Figure 6A:
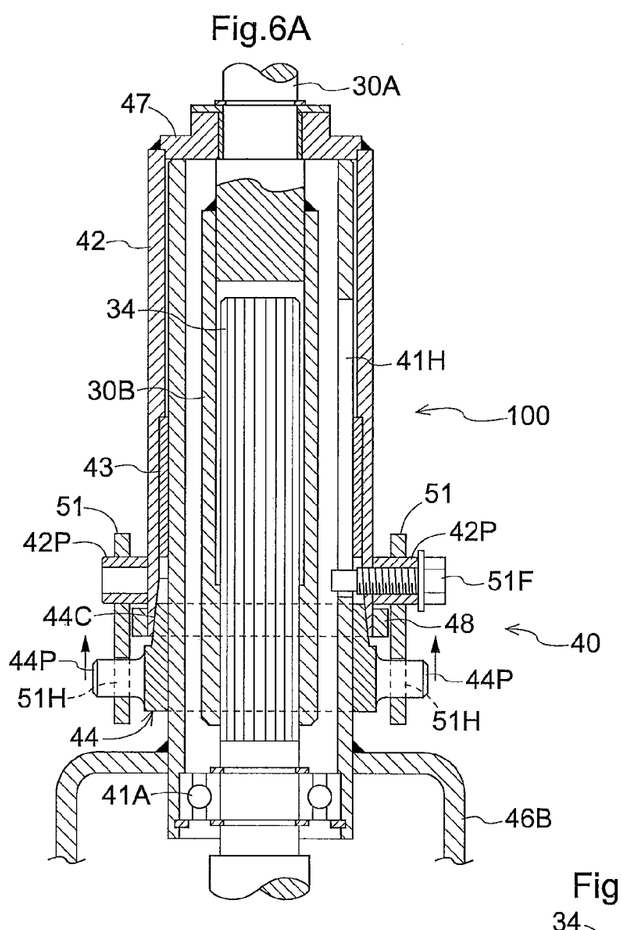
FIG. 6A is a front view showing the action of the extension/retraction mechanism.
Figure 6B:
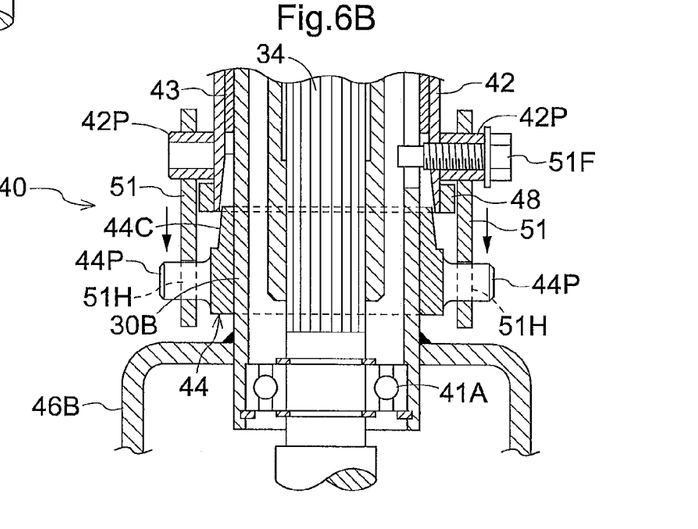
FIG. 6B is another front view showing the action of the extension/retraction mechanism.

The wedge-shaped tube body 44 is supported so as to be capable of moving between an operational position at which the tip portion 44B of the wedge-shaped tube body 44 is pressed in between the inner tube member 41 and the outer tube member 42 as shown in FIGS. 5A and 6A, and a non-operational position at which the tip portion 44B has been pulled out from between the inner tube member 41 and the outer tube member 42 as shown in FIGS. 5B and 6B. The restriction mechanism 40 includes a restriction operation portion 50 for pressing the wedge-shaped tube body 44 upward from the lower end side of the outer tube member 42 in between the inner tube member 41 and the outer tube member 42.

The restriction operation portion 50 has a pair of operation plate portions 51 that are pivotally supported to the lower end region of the outer circumference of the outer tube member 42, and an operation handle portion 52 that extends radially outward from one end of the operation plate portions 51.

Insertion holes 51D for receiving the cylinder members 42P of the outer tube member 42 are formed in the upper end regions of the operation plate portions 51, and an elongated hole 51H having arc-shaped cam faces is formed below each insertion hole 51D.

As shown in FIG. 7, the restriction operation portion 50 is mounted such that the pair of cylinder members 42P are inserted in the insertion holes 51D, and the pair of operated shaft portions 44P of the wedge-shaped tube body 44 are inserted in the elongated holes 51H.

As a means for retaining the operation plate portions 51, a washer head bolt 51F, whose washer has a diameter that sufficiently exceeds the inner diameter of the insertion holes 51D, is screwed into female threading formed in the inner face of one of the cylinder members 42P.

Each elongated hole 51H is disposed in an inclined manner such that the rear end of the elongated hole 51H is more distant from the fulcrum point of the restriction operation portion 50, which is determined by the insertion hole 51D, than the front end of the elongated hole 51H is, thus forming cam faces for an operation for moving the operated shaft portion 44P of the wedge-shaped tube body 44 along the shaft center of the steering wheel 10 in accordance with an operation for swinging the restriction operation portion 50.

Specifically, the lower face of the elongated hole 51H configures a first cam face 51P for an operation for moving the operated shaft portion 44P of the wedge-shaped tube body 44 upward in accordance with an operation for swinging the restriction operation portion 50 upward from an unlocking position indicated by a dashed double-dotted line in FIG. 3 to a locking position indicated by a solid line in FIG. 3. Similarly, the upper face of the elongated hole 51H configures a second cam face 51Q for an operation for moving the operated shaft portion 44P of the wedge-shaped tube body 44 downward in accordance with an operation for swinging the restriction operation portion 50 downward from the locking position to the unlocking position.

As shown in FIGS. 5A and 6A, when the restriction operation portion 50 has been swung to the upper locking position using the operation handle portion 52, the operated shaft portions 44P of the wedge-shaped tube body 44 are in contact with the front ends of the elongated holes 51H, and the wedge-shaped tube body 44 is at the operational position at which the tip portion 44B has been pressed upward in between the inner tube member 41 and the outer tube member 42.

As previously mentioned, the shaft center X2 of the cylinder-shaped inner circumferential face 44D of the wedge-shaped tube body 44 is eccentric to the shaft center X1 of the tapered outer circumferential face 44C, and therefore when the wedge-shaped tube body 44 is at this operational position, an effect is achieved in which the shaft center of the outer tube member 42 is inclined in the front-rear direction relative to the shaft center of the inner tube member 41, and the tube-shaped bushing 43 is firmly clamped between the outer face of the inner tube member 41 and the inner face of the outer tube member 42, thus preventing relative movement between the inner tube member 41 and the outer tube member 42 and an operation for extending/retracting the steering wheel 10.

Also, as shown in FIG. 7, at least the forward regions of the first cam faces 51P are provided with a braking face that has recessions and projections for raising the friction coefficient with the operated shaft portion 44P when the restriction operation portion 50 is at the locking position.

On the other, when the restriction operation portion 50 is swung to the lower unlocking position as shown in FIGS. 5B and 6B, the operated shaft portions 44P of the wedge-shaped tube body 44 are in contact with the rear ends of the elongated holes 51H, and the wedge-shaped tube body 44 is at the non-operational position at which the tip portion 44B has been pulled out from between the inner tube member 41 and the outer tube member 42, and therefore free relative movement between the inner tube member 41 and the outer tube member 42 is not restricted by the bushing 43. Accordingly, an operation for extending/retracting the steering wheel 10 can be performed by raising and lowering the steering wheel 10.

As shown in FIG. 7, an elongated hole 41H that extends linearly and parallel to the shaft center of the steering wheel 10 is formed in part of the inner tube member 41. As a means for retaining the operation plate portions 51, the unthreaded tip of the washer head bolt 51F, which is threadedly engaged with the inner face of one of the cylinder members 42P, is inserted into the elongated hole 41H, thus configuring a means for stopping rotation of the outer tube member 42 relative to the inner tube member 41, and simultaneously configuring a means for preventing the upper steering shaft 30B from slipping off the second lower steering shaft 34 when an operation for extending the steering wheel 10 is performed.

[Configuration of Inner Diameter Adjustment Mechanism]

An inner diameter adjustment mechanism (an example of an adjustment mechanism) that enables an operation for reducing the inner diameter of the lower end portion of the outer tube member 42 is provided in order to adjust the dimension of the gap between the outer tube member 42 and the inner tube member 41 to a value suited to the tapered outer circumferential face 44C of the wedge-shaped tube body 44, or in other words, so as to sufficiently exhibit friction force that acts on the outer tube member 42 and the inner tube member 41 due to the wedge-shaped tube body 44 being pressed in, or sufficiently exhibit the effect where the tube-shaped bushing 43 is clamped between the inner tube member 41 and the outer tube member 42 due to the wedge-shaped tube body 44 being pressed in.

As shown in FIG. 7, the inner diameter adjustment mechanism includes a slit 42S that extends upward from the lower end of the outer tube member 42 and a constricting means for reducing the width of the slit 42S. The constricting means includes a band-shaped member 48 that is wrapped around the outer tube member 42 at a position in the vicinity of the slit 42S, and a bolt 49A and a nut 49B for reducing the virtual inner diameter of the band-shaped member 48.

The band-shaped member 48 has a substantially ring-shaped band body 48A and a pair of projecting pieces 48B and 48C that extend radially outward from respective ends of the band body 48A. The one projecting piece 48B has a flat rectangular plate shape, and a bent portion 48D that extends toward part of the projecting piece 48B is formed at the tip of the other projecting piece 48C.

Part of the band body 48A, such as a site on the band body 48A that opposes the projecting pieces 48B and 48C across the shaft center of the steering wheel 10, is fixed by welding or the like to the outer circumferential face of the outer tube member 42.

Through-holes are formed at mutually opposing positions on the pair of projecting pieces 48B and 48C. When a male threaded portion of the bolt 49A that has been inserted through these through-holes is screwed into the nut 49B, firstly the bent portion 48D at the tip of the projecting piece 48C comes into contact with the other projecting piece 48B (or is initially in contact with it), and then as the bolt 49A is tightened, the base portions of the pair of projecting pieces 48B and 48C are effectively brought closer to each other without their tips being brought closer to each other, thus reducing the width of the slit 42S so as to reduce the diameter of the lower end portion of the outer tube member 42.

Alternatively, instead of the band-shaped member 48 wrapped around the outer tube member 42, a mode is possible in which a pair of base members are mounted by welding or the like to the outer circumference of the outer tube member 42 at two positions sandwiching the slit 42S, and the pair of projecting pieces 48B and 48C extend radially outward from inner-side end portions of the base members.

As shown in FIG. 4, the second steering wheel support frame 46B that supports the lower end region of the inner tube member 41 is supported to the upper end region of the first steering wheel support frame 46A, which is disposed so as to oppose the upper end of the power steering unit PS, so as to be capable of rotating about a horizontal axis X3 that conforms to the rotational shaft center of the universal joint UJ.

[Configuration of Tilt Mechanism]

As shown in FIG. 3, a tilt mechanism 200 for adjusting the angle of the upper steering shafts 30A and 30B relative to the first lower steering shaft 33 is provided between the first steering wheel support frame 46A and the second steering wheel support frame 46B.

The tilt mechanism 200 has an oil cylinder 25 whose lower end is pivotally supported to a tilt stay portion 45B that extends rearward and downward from the lower first steering wheel support frame 46A. Also, the tip of an extension/retraction operation tube 26 that extends from the upper end of the oil cylinder 25 is fixed to a tilt control body 27 that is pivotally supported to the rear face of the second steering wheel support frame 46B.

A control rod 28, which opens and closes the oil port (not shown) of a control piston disposed in the oil cylinder 25, extends from an opening portion at the tip of the extension/retraction operation tube 26, and when the control rod 28 is pressed down by a tilt control handle 29 that is pivotally supported to the tilt control body 27, the oil port is opened so as to enable changing the angle of the upper steering shafts 30A and 30B relative to the first lower steering shaft 33, that is to say, the angle of the shaft center of the steering wheel 10.

[Mounting Structure for Steering Apparatus and Power Steering Unit]

As shown in FIGS. 2 and 4, an opening portion is formed between the sound isolation panel 24A disposed in front of the steering wheel 10 and the sound isolation panel 24B disposed below the steering wheel 10, and this opening portion is for the insertion of the first lower steering shaft 33 serving as a means for input to the power steering unit PS located on the engine compartment D side.

Figure 9:
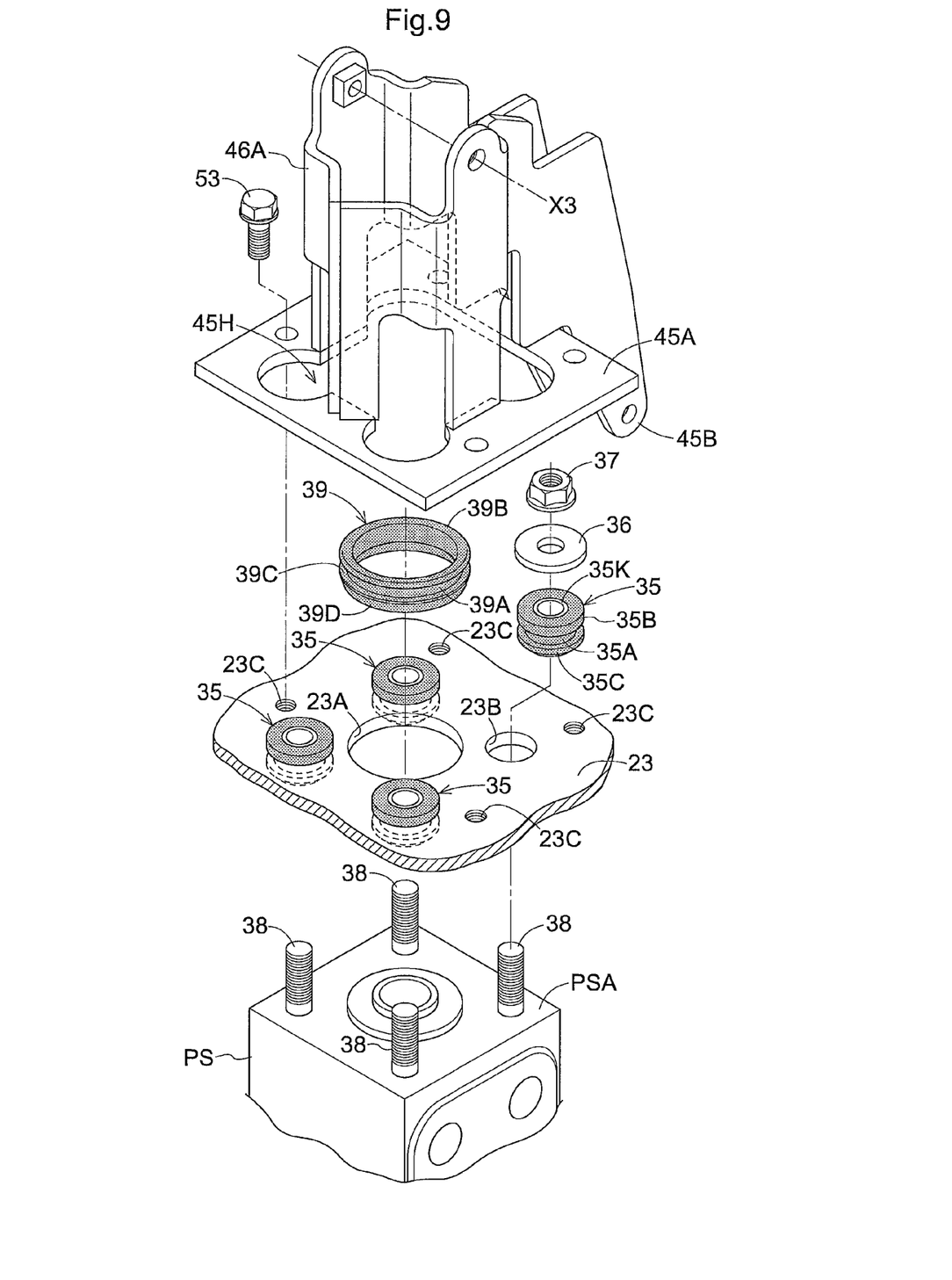
FIG. 9 is an exploded perspective view showing a mounting structure for the steering apparatus and the power steering unit.

As shown in FIGS. 4 and 9, the first steering wheel support frame 46A of the steering apparatus ST is connected by bolts 53 to the upper face of a base plate 23 that is disposed so as to close the aforementioned opening portion, and the power steering unit PS is connected by bolts to the lower face of the base plate 23 via anti-vibration rubber or the like.

More specifically, as shown in FIG. 9, a first through-hole 23A for the insertion of the first lower steering shaft 33 is formed in the central region of the base plate 23 with respect to the left-right direction. Also, four second through-holes 23B, which are for the insertion of four mounting bolts 38 that extend upward from the upper end of the power steering unit PS, are formed so as to surround the first through-hole 23A. Furthermore, four female threaded holes 23C for mounting the first steering wheel support frame 46A are formed in the base plate 23, rearward of the second through-holes 23B.

A ring-shaped sealing member 39 (an example of an elastic sealing member) is fit inside an inner circumferential portion of the first through-hole 23A, and grommets 35 (an example of an anti-vibration member) that are made of rubber and include flanges at the top and bottom are fit inside the four second through-holes 23B.

The ring-shaped sealing member 39 includes a cylinder-shaped supported portion 39A, a first flange portion 39B that extends radially outward from the upper end of the supported portion 39A, a second flange portion 39C that extends radially outward from the lower end of the supported portion 39A, and a ring-shaped lip portion 39D that protrudes downward from the radially outward end portion of the second flange portion 39C.

When the ring-shaped sealing member 39 is fit inside the first through-hole 23A, the outer circumferential face of the supported portion 39A is supported to the inner circumferential portion of the first through-hole 23A, the lower face of the first flange portion 39B is in contact with the upper face of the base plate 23, and the upper face of the second flange portion 39C is in contact with the lower face of the base plate 23.

Each grommet 35 includes a cylinder-shaped supported portion 35A, a first flange portion 35B that extends radially outward from the upper end of the supported portion 35A, and a second flange portion 35C that extends radially outward from the lower end of the supported portion 35A.

When the grommet 35 is fit inside the second through-hole 23B, the outer circumferential face of the supported portion 35A is supported to the inner circumferential portion of the second through-hole 23B, the lower face of the first flange portion 35B is in contact with the upper face of the base plate 23, and the upper face of the second flange portion 35C is in contact with the lower face of the base plate 23.

The mounting bolts 38 of the power steering unit PS are inserted from below into the insertion holes of the grommets 35 that are fitted inside the second through-holes 23B, and are fixed with washers 36 and nuts 37 fastened thereto such that the second flange portions 35C of the grommets 35 are clamped between an upper face PSA of the power steering unit PS and the lower face of the base plate 23. The state in which the upper and lower end faces of collars 35K, which are engagedly inserted in the insertion holes of the grommets 35, are in contact with the lower faces of the washers 36 and the upper face of the base plate 23 serves as the reference for performing the fastening.

When the fixing by fastening is complete, the second flange portions 35C of the grommets 35 are compressed to a predetermined thickness, and as shown in FIG. 4, the entire circumference of only a local portion of the lower end portion of the ring-shaped lip portion 39D of the ring-shaped sealing member 39 is elastically clamped to the upper face PSA of the power steering unit PS. The lower end portion of the ring-shaped lip portion 39D has an acute-angled cross-sectional shape, and thus is an easily-deformed portion that easily undergoes elastic deformation when pressed against the upper face PSA of the power steering unit PS.

As a result, the ring-shaped gap formed between the upper face PSA of the power steering unit PS and the first through-hole 23A is reliably sealed by the ring-shaped lip portion 39D of the ring-shaped sealing member 39, thus preventing dust from entering the driver's compartment B from the engine compartment D, and effectively suppressing the entrance of noise to the driver's compartment B as well.

Also, vibration generated inside the power steering unit PS is attenuated by the grommets 35 used in the mounting of the power steering unit PS, and therefore is not readily transmitted to the driver's compartment B via the base plate 23. Here, the ring-shaped sealing member 39 is in contact with the upper face PSA of the power steering unit PS via only the tip of the ring-shaped lip portion 39D that easily undergoes elastic deformation, and therefore there is no risk of the attenuating effect of the grommets 35 being inhibited by the ring-shaped sealing member 39 and vibration being transmitted from the ring-shaped sealing member 39 to the cabin C and the driver's compartment B via the base plate 23.

Furthermore, as shown in FIGS. 3 and 4, a ring-shaped space S that has a sufficient width in the diameter direction is formed between the inner circumferential portion of the ring-shaped sealing member 39 and the first lower steering shaft 33 such that the ring-shaped sealing member 39 is maintained in the state of being separated from the first lower steering shaft 33 regardless of the vibration generated by the power steering unit PS. Accordingly, there is no risk of vibration generated by the power steering unit PS being transmitted from the first lower steering shaft 33 to the base plate 23, the cabin C, the driver's compartment B, and the like via the ring-shaped sealing member 39.

Figure 10:
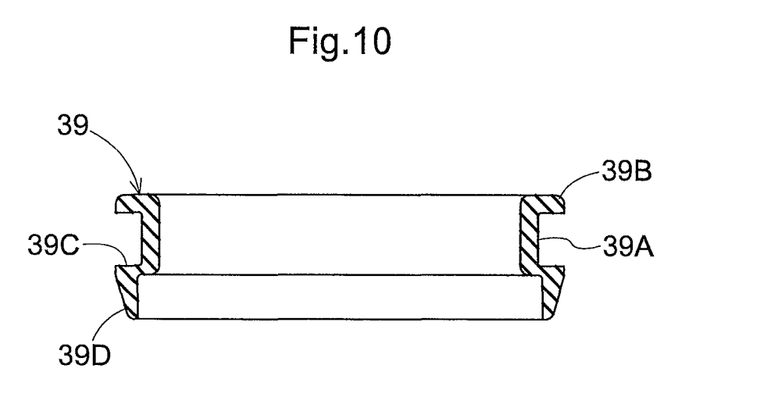
FIG. 10 is a cutaway side view showing a ring-shaped sealing member (elastic sealing member).

Note that a mode is possible in which the ring-shaped lip portion 39D, which extends from the radially outward end portion of the second flange portion 39C, is shaped so as to extend not straight downward, but rather radially inward in the downward direction, for example, as illustrated in FIG. 10, such that the entire circumference of the tip region of the lower end portion of the ring-shaped lip portion 39D reliably deforms in a certain direction when pressed against the upper face PSA of the power steering unit PS. Note that the ring-shaped lip portion 39D may be shaped so as to extend radially outward in the downward direction based on the assumption that its tip portion does not interfere with the grommets 35 and the like.

The first steering wheel support frame 46A is connected to the upper face of the base plate 23 via a rectangular flange portion 45A formed therebelow. A through-hole 45H, which is for the insertion of the first lower steering shaft 33 and for avoiding interference with the ring-shaped sealing member 39 and the four grommets 35, is formed in the flange portion 45A.

What is claimed is:

1. A tractor comprising:
   a driver's compartment;
   an engine compartment;
   a partitioning member that partitions the driver's compartment and the engine compartment and has a through-hole formed therein;
   a steering wheel provided in the driver's compartment;
   a power steering unit disposed on the engine compartment side;
   a steering shaft that extends from the steering wheel and is connected to the power steering unit;
   an elastic sealing member that is provided in an inner circumferential portion of the through-hole, and includes a supported portion that is supported to the inner circumferential portion and a ring-shaped lip portion that protrudes downward from one end of the supported portion; and
   an anti-vibration member,
   wherein the power steering unit is mounted to the partitioning member via the anti-vibration member, the ring-shaped lip portion is elastically clamped to an upper face of the power steering unit, and the steering shaft is connected to the power steering unit in a state of being inserted in the through-hole.

2. The tractor according to claim 1, wherein at least a tip portion of the ring-shaped lip portion extends inclined one of radially inward and radially outward relative to a shaft center of the steering shaft.

3. The tractor according to claim 1,
   wherein the steering shaft has an upper steering shaft having the steering wheel at an upper portion, and a lower steering shaft whose lower portion is connected to the power steering unit, and
   the tractor further comprises:
   an extension/retraction mechanism that enables integral rotation of the upper steering shaft and the lower steering shaft and relative movement thereof along a shaft center; and
   a restriction mechanism that restricts the relative movement of the upper steering shaft and the lower steering shaft along the shaft center, the restriction mechanism having an inner tube member that covers and supports the lower steering shaft, an outer tube member that covers and supports the upper steering shaft, and a wedge member that is operated so as to be pressed upward from a lower end side of the outer tube member in between the inner tube member and the outer tube member.

4. The tractor according to claim 3, wherein a tube-shaped bushing is provided in a ring-shaped gap between the inner tube member and the outer tube member, and the wedge member is a wedge-shaped tube body that has a cylinder-shaped inner circumferential face that interacts with an outer circumferential face of the inner tube member, and a tapered outer circumferential face that interacts with an inner circumferential face of the outer tube member, a shaft center of the cylinder-shaped inner circumferential face being eccentric to a shaft center of the tapered outer circumferential face.

5. The tractor according to claim 3, further comprising a constricting member having a slit that extends upward from a lower end of the outer tube member and a constricting portion that operates such that outer circumferential positions of the outer tube member that are positioned sandwiching the slit are brought closer to each other.

\* \* \* \* \*